(12) United States Patent
Ueyama

(10) Patent No.: US 7,965,889 B2
(45) Date of Patent: Jun. 21, 2011

(54) IMAGING APPARATUS, IMAGING METHOD, PROGRAM AND RECORDING MEDIUM

(75) Inventor: Teruhiko Ueyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1010 days.

(21) Appl. No.: 11/275,828

(22) Filed: Jan. 31, 2006

(65) Prior Publication Data

US 2006/0170697 A1   Aug. 3, 2006

(30) Foreign Application Priority Data

Jan. 31, 2005   (JP) ................. 2005-023938

(51) Int. Cl.
*G06K 9/00* (2006.01)
(52) U.S. Cl. ........ 382/167; 382/162; 382/260; 382/300; 382/275; 348/363; 348/223.1; 348/361; 348/224.1; 348/169
(58) Field of Classification Search .......... 382/167, 382/162, 260, 300, 275; 348/363, 223.1, 348/223, 64, 333.3, 362, 333.01, 231; 345/589
See application file for complete search history.

(56) References Cited

U.S. PATENT DOCUMENTS

| | | | | |
|---|---|---|---|---|
| 4,833,531 A | * | 5/1989 | Abe et al. ................ | 382/300 |
| 5,125,042 A | * | 6/1992 | Kerr et al. ................ | 358/300 |
| 5,189,529 A | * | 2/1993 | Ishiwata et al. ........... | 358/451 |
| 5,537,230 A | * | 7/1996 | Chiba et al. .............. | 358/521 |
| 5,610,654 A | * | 3/1997 | Parulski et al. ........... | 348/229.1 |
| 5,793,435 A | * | 8/1998 | Ward et al. ............... | 348/448 |
| 6,058,208 A | * | 5/2000 | Ikeda et al. .............. | 382/167 |
| 6,236,431 B1 | * | 5/2001 | Hirasawa et al. ......... | 348/240.99 |
| 6,593,963 B1 | * | 7/2003 | Safai ..................... | 348/222.1 |
| 6,597,363 B1 | * | 7/2003 | Duluk et al. ............. | 345/506 |
| 6,618,091 B1 | * | 9/2003 | Tamura .................. | 348/363 |
| 6,664,973 B1 | * | 12/2003 | Iwamoto et al. .......... | 345/589 |
| 6,674,551 B1 | * | 1/2004 | Takura ................... | 358/451 |
| 6,778,216 B1 | * | 8/2004 | Lin ....................... | 348/333.11 |
| 6,795,063 B2 | * | 9/2004 | Endo et al. .............. | 345/204 |
| 6,947,170 B2 | * | 9/2005 | Takura ................... | 358/1.2 |
| 6,954,228 B1 | * | 10/2005 | Acharya et al. ........... | 348/223.1 |
| 7,061,529 B2 | * | 6/2006 | Nakamura .............. | 348/222.1 |
| 2002/0080245 A1 | * | 6/2002 | Parulski et al. ........... | 348/223 |

(Continued)

FOREIGN PATENT DOCUMENTS

EP   0814429 A2 * 12/1997

(Continued)

OTHER PUBLICATIONS

Office Action dated Jan. 28, 2011 in JP 2005-023938.

*Primary Examiner* — Brian Q Le
*Assistant Examiner* — Mekonen Bekele
(74) *Attorney, Agent, or Firm* — Fitzpatrick, Cella, Harper & Scinto

(57) ABSTRACT

An image processing apparatus has an enlargement processing function of displaying an image on an image display unit at a designated enlargement magnification, and a color conversion processing function of changing a designated conversion source color to a conversion destination color. This image processing apparatus determines at least one of the conversion source color and conversion destination color by acquiring color information from a predetermined area in the displayed image. Upon determining one of the conversion source color and conversion destination color, control according to the enlargement magnification of the enlargement processing function is made so as to assure an amount, which is equal to or larger than a predetermined value, of color information included in the predetermined area.

21 Claims, 12 Drawing Sheets

U.S. PATENT DOCUMENTS

| | | | |
|---|---|---|---|
| 2002/0164085 A1* | 11/2002 | Norimatsu | 382/275 |
| 2003/0156206 A1* | 8/2003 | Ikeda et al. | 348/223.1 |
| 2004/0036898 A1* | 2/2004 | Takahashi | 358/1.9 |
| 2004/0085458 A1* | 5/2004 | Yanof et al. | 348/223.1 |
| 2004/0201766 A1* | 10/2004 | Funston et al. | 348/333.02 |
| 2004/0246359 A1* | 12/2004 | Ogino et al. | 348/333.01 |
| 2005/0213128 A1* | 9/2005 | Imai et al. | 358/1.9 |
| 2006/0170697 A1* | 8/2006 | Ueyama | 345/589 |
| 2007/0211153 A1* | 9/2007 | Uchida et al. | 348/231.99 |

FOREIGN PATENT DOCUMENTS

| | | | |
|---|---|---|---|
| JP | 11-262029 | * | 9/1999 |
| JP | 2003-125270 | | 4/2003 |
| JP | 2003125270 A | * | 4/2003 |
| JP | 2003-244723 | | 8/2003 |
| JP | 2003-299115 | * | 10/2003 |
| JP | 2003299115 A | * | 10/2003 |
| JP | 2004-80100 | | 3/2004 |

* cited by examiner

FIG. 5

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

BAYER MATRIX CCD SIGNAL

FIG. 6

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| G1 | G1 | G1 | G1 | G1 | G1 |
|----|----|----|----|----|----|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

| G2 | G2 | G2 | G2 | G2 | G2 |
|----|----|----|----|----|----|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

BAYER INTERPOLATED SIGNAL

FIG. 7

| | | |
|---|---|---|
| 1/16 | 2/16 | 1/16 |
| 2/16 | 4/16 | 2/16 |
| 1/16 | 2/16 | 1/16 |

IMAGING APPARATUS, IMAGING METHOD, PROGRAM AND RECORDING MEDIUM

FIELD OF THE INVENTION

The present invention relates to a technique for color conversion processing using colors included within a designated range of an image and, more particularly, to an imaging apparatus which allows the user to customize colors, and its control method.

BACKGROUND OF THE INVENTION

For example, Japanese Patent Laid-Open No. 2004-80100 has proposed a color conversion processing technique for converting a local color in a displayed image into another color designated by the user by generating a color conversion table expressed by a color space in an image processing apparatus.

In the aforementioned color processing, in order to extract color information to be converted from a displayed image (to capture a color), a color capture index (e.g., a frame or the like) used to designate a range to be extracted is displayed. Using pixel information within this color capture index, a color to be used in color conversion is determined. However, if the range of this color capture index is broad (for example, if the frame is large), other colors are unwantedly extracted, and a desired color conversion effect cannot be obtained. If the range of the color capture index is narrow (for example, if the frame is small), since the number of samples of pixels decreases, it becomes difficult to specify a pixel having the same color as the extracted color, resulting in low color conversion precision.

For this reason, the range (size) of the color capture index is empirically determined to obtain desired color conversion precision.

However, when so-called digital zoom processing for enlarging an image by pixel interpolation is applied to display an image, if color extraction using the color capture index is made, the number of sampling pixels included in the index substantially decreases. For this reason, the color conversion precision drops, and a desired color conversion effect cannot often be obtained.

SUMMARY OF THE INVENTION

The present invention has been made in consideration of the aforementioned problems, and has as its object to suitably capture a color which is to undergo color conversion processing while permitting digital zoom, and to implement color conversion processing with high precision.

According to one aspect of the present invention, there is provided an image processing apparatus comprising; an image display unit configured to display an image; an acquisition unit configured to acquire color information from a predetermined area in the image displayed on the image display unit; a determination unit configured to determine a conversion source color and a conversion destination color, at least one of the conversion source color and the conversion destination color being determined based on the color information acquired by the acquisition unit; a color conversion unit configured to perform color conversion of the image based on the conversion source color and the conversion destination color determined by the determination unit; an enlargement unit configured to display the image displayed on the image display unit at a designated enlarged magnification; and a control unit configured to assure an amount, which is not less than a predetermined value, of color information included in the predetermined area in accordance with the enlargement magnification of the enlargement unit in a case that the acquisition unit acquires the color information.

Also, according to another aspect of the present invention, there is provided an image processing method comprising; an image display step of displaying an image on a display unit; an acquisition step of acquiring color information from a predetermined area in the image displayed on the display unit; a determination step of determining a conversion source color and a conversion destination color, at least one of the conversion source color and the conversion destination color being determined based on the color information acquired in the acquisition step; a color conversion step of performing color conversion of the image based on the conversion source color and the conversion destination color determined in the determination step; an enlargement step of displaying the image displayed on the display unit at a designated enlarged magnification; and a control step of assuring an amount, which is not less than a predetermined value, of color information included in the predetermined area in accordance with the enlargement magnification in the enlargement step in a case that the color information is acquired in the acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a conceptual view for explaining a color matrix of a CCD in the imaging apparatus according to the embodiment of the present invention;

FIG. 6 is a conceptual view for explaining data after interpolation of CCD signals in the imaging apparatus according to the embodiment of the present invention;

FIG. 7 is a view for explaining a filter used in luminance signal generation processing according to the embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
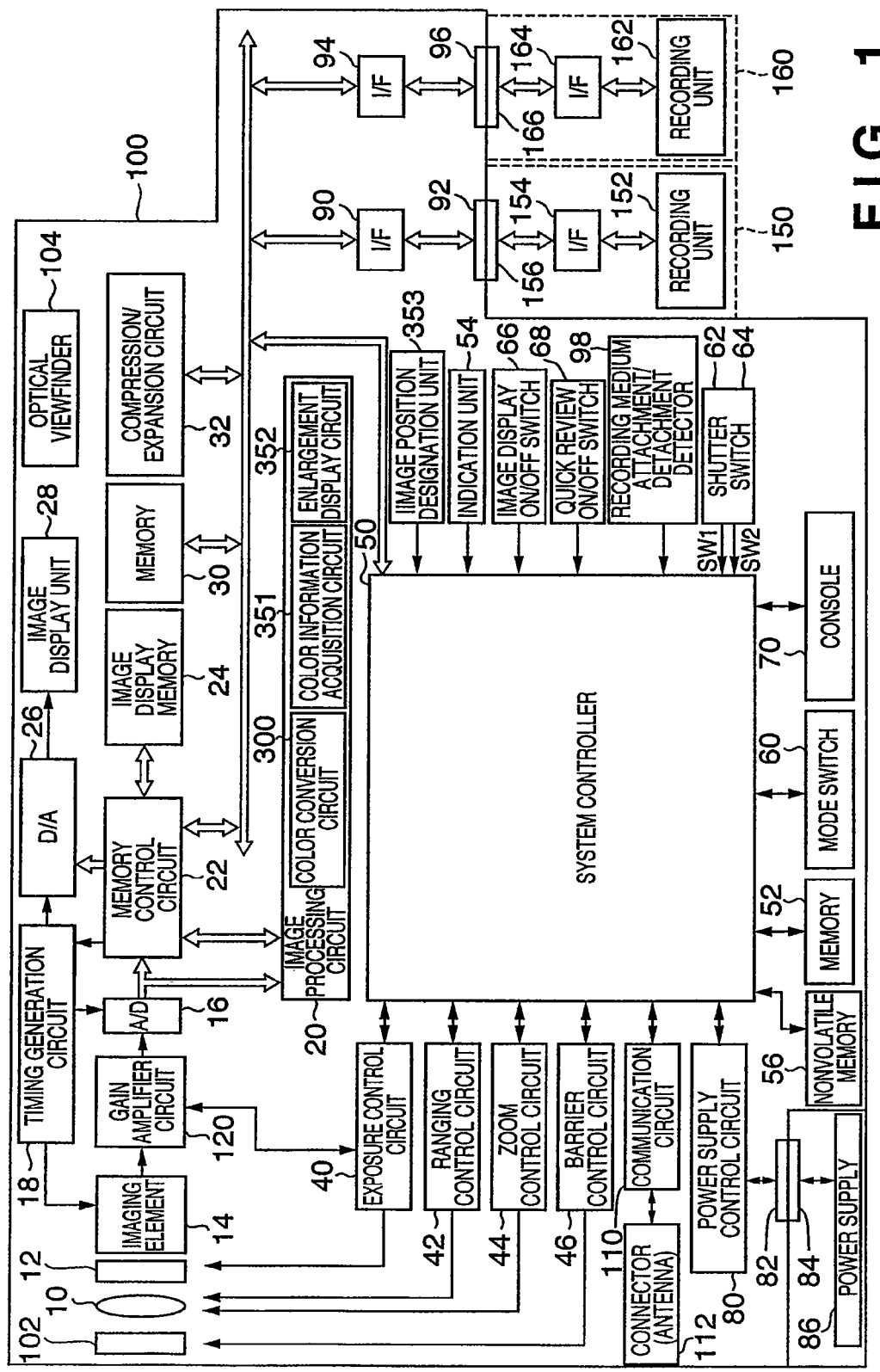
FIG. 1 is a block diagram showing the arrangement of an imaging apparatus according to an embodiment of the present invention.

FIG. 1 is a block diagram showing the arrangement of an imaging apparatus 100 according to the first embodiment of the present invention. Referring to FIG. 1, reference numeral 10 denotes an imaging lens. Reference numeral 12 denotes an aperture/shutter unit which incorporates an aperture and shutter. Reference numeral 14 denotes an imaging element which converts an optical image into an electrical signal. Reference numeral 120 denotes a gain amplifier circuit which amplifies an analog signal output of the imaging element 14. The sensitivity of the camera is adjusted by adjusting the gain by the gain amplifier circuit 120. Reference numeral 16 denotes an A/D converter which converts the analog signal output of the imaging element 14 into a digital signal. Reference numeral 18 denotes a timing generation circuit which supplies clock signals and control signals to the imaging element 14, the A/D converter 16, and a D/A converter 26. The timing generation circuit 18 is controlled by a memory control circuit 22 and system control circuit 50.

Reference numeral 20 denotes an image processing circuit which applies predetermined pixel interpolation processing and color conversion processing to data from the A/D converter 16 or data from the memory control circuit 22. Also, the image processing circuit 20 applies predetermined arithmetic processing using captured image data. The system control circuit 50 controls an exposure control circuit 40 and a ranging control circuit 42 based on the arithmetic processing result obtained by the image processing circuit 20. With this control, the system control circuit 50 implements TTL (through the lens metering) AF (auto-focus) processing, AE (auto-exposure) processing, and EF (flash pre-emission) processing. Furthermore, the image processing circuit 20 executes predetermined arithmetic processing using the captured image data, and also executes AWB (auto-white balance) processing based on the obtained arithmetic result. A color conversion circuit 300, color information acquisition circuit 351, and enlargement display circuit 352 are representative circuits which form the image processing circuit 20. The color conversion circuit 300 executes processing for converting a color included in an image into another color (details will be described later with reference to FIG. 3). The color information acquisition circuit 351 executes processing for acquiring partial color information in an image. The enlargement display circuit 352 executes processing for partially extracting a partial image from image data input from the imaging element and displaying it on an image display unit 28 at an enlargement magnification.

Reference numeral 22 denotes a memory control circuit which controls the A/D converter 16, the timing generation circuit 18, the image processing circuit 20, an image display memory 24, the D/A converter 26, a memory 30, and a compression/decompression circuit 32. With this control, data from the A/D converter 16 is written in the image display memory 24 or memory 30 via the image processing circuit 20 and memory control circuit 22 or directly through the memory control circuit 22.

Reference numeral 50 denotes a system control circuit which controls the overall image processing apparatus 100. For example, the system control circuit 50 executes processing for acquiring the luminance level measured by TTL via the memory control circuit 22, calculating an appropriate exposure value based on that level, and controlling the exposure control circuit 40, and so forth.

Reference numeral 24 denotes an image display memory; and 26, a D/A converter. Reference numeral 28 denotes an image display unit which comprises a TFT-LCD, or the like. Display image data written in the image display memory 24 is displayed on the image display unit 28 via the D/A converter 26. When the captured image data are sequentially displayed using the image display unit 28, an electric viewfinder function can be implemented. The image display unit 28 can arbitrarily turn on/off its display function in accordance with an instruction from the system control circuit 50. When the display function of the image display unit 28 is turned off, the consumption power of the image processing apparatus 100 can be greatly saved.

Reference numeral 30 denotes a memory, which is used to store captured still and moving images. The memory 30 has a sufficiently large memory size that can store a predetermined number of still images and a moving image for a predetermined period of time. In case of continuous-shot or panorama imaging that continuously capture a plurality of still images, write access of a large number of images can be made on the memory 30 at high speed. In addition, the memory 30 can be used as a work area of the system control circuit 50.

Reference numeral 32 denotes a compression/decompression circuit which compresses/decompresses image data by adaptive discrete cosine transformation (ADCT) or the like. More specifically, the compression/decompression circuit 32 executes compression or decompression processing by loading an image stored in the memory 30 and writes back the processed data in the memory 30.

Reference numeral 40 denotes an exposure control circuit which controls the shutter unit 12 having an aperture function. Reference numeral 42 denotes a ranging control circuit which controls focusing of the imaging lens 10. Reference numeral 44 denotes a zoom control circuit which controls zooming (optical zoom) of the imaging lens 10. Reference numeral 46 denotes a barrier control circuit which controls the operation of a protection member 102 as a barrier. Note that the exposure control circuit 40 and ranging control circuit 42 are controlled using the TTL system. The system control circuit 50 implements such control by controlling the exposure control circuit 40 and ranging control circuit 42 based on the arithmetic results of captured image data by the image processing circuit 20.

Reference numeral 52 denotes a memory which stores constants, variables, programs, and the like required to operate the system control circuit 50. Reference numeral 54 denotes an indication unit. The indication unit 54 includes a liquid crystal display device which displays operation states, messages, and the like using text and icons, a loudspeaker which informs operation states and the like by means of voices, and the like, in accordance with execution of programs by the system control circuit 50. The indication unit 54 is set at one or a plurality of easy-to-see positions around the console of the image processing apparatus 100, and is constructed by a combination of an LCD, LEDs, sound generation element, and the like. Some functions of the indication unit 54 are set within an optical viewfinder 104.

Of the indication contents of the indication unit 54, those displayed on the LCD or the like include, e.g., a single-shot/continuous-shot imaging indication, self timer indication, compression ratio indication, recording pixel count indication, recorded image count indication, remaining recordable image count indication, shutter speed indication, aperture value indication, exposure correction indication, red-eye effect suppression indication, macro imaging indication, buzzer setting indication, remaining timepiece battery capacity indication, remaining battery capacity indication, error indication, information indication using numerals of a plurality of digits, attachment/detachment indication of recording media 150 and 160, communication I/F operation indication, date/time indication, and the like. Of the indication contents of the indication unit 54, those displayed within the optical viewfinder 104 include, e.g., in-focus indication, camera shake alert indication, strobe charging indication, shutter speed indication, aperture value indication, exposure correction indication, and the like.

Reference numeral 56 denotes a nonvolatile memory, which is electrically erasable and recordable. As the nonvolatile memory 56, for example, an EEPROM or the like is used.

Reference numerals 60, 62, 64, 66, 68, 70, and 353 denote operation units for inputting various operation instructions of the system control circuit 50. These operation units are constructed by one or a plurality of combinations of a switch, a dial, a touch panel, a pointer using line of sight detection, a voice recognition device, and the like. Examples of these operation units will be explained in detail below.

Reference numeral 60 denotes a mode switch which allows the user to select settings such as a color conversion mode, nightscape mode, child imaging mode, fire works imaging mode, underwater imaging mode, and the like in accordance with various imaging scenes in addition to an auto mode, program mode, aperture-priority mode, shutter speed-priority mode.

Figure 2:
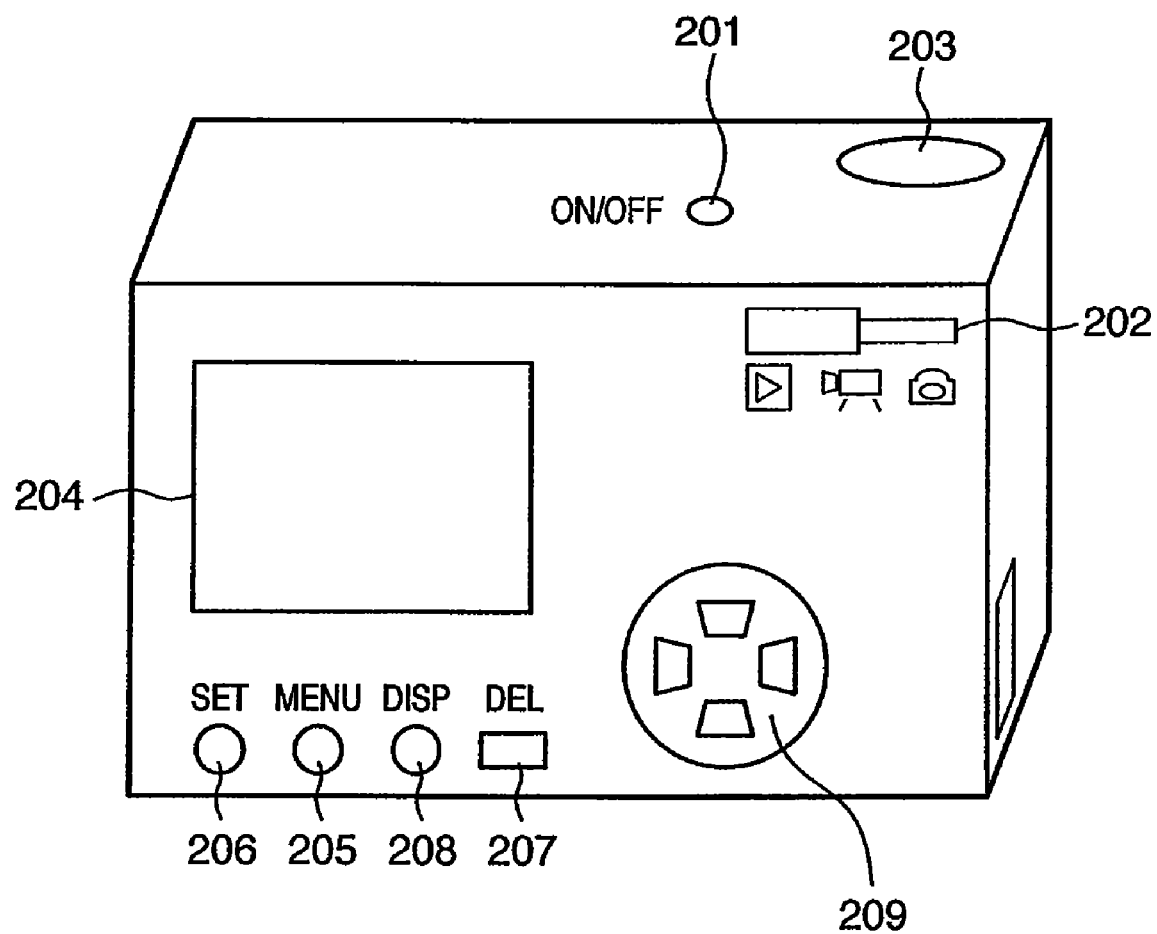
FIG. 2 shows the outer appearance of the imaging apparatus according to the embodiment of the present invention.

Reference numeral 62 denotes a shutter switch SW1 which is turned on in the middle of operation of a shutter button (203 in FIG. 2). When the shutter switch SW1 is turned on, it instructs to start the AF (auto-focus) processing, AE (auto-exposure) processing, AWB (auto-white balance) processing, EF (strobe pre-emission) processing, and the like. Reference numeral 64 denotes a shutter switch SW2 which is turned on upon completion of operation of the shutter button (203). In response to a signal SW2 from the shutter switch 64, it is instructed to start an imaging operation including a series of processes such as exposure processing, development processing, and recording processing. Note that the exposure processing is processing for writing a signal read out from the imaging element 14 as image data in the memory 30 via the A/D converter 16 and memory control circuit 22. The development processing is implemented by the arithmetic operations of the image processing circuit 20 and memory control circuit 22. The recording processing is processing for reading out image data from the memory 30, compressing the readout data by the compression/decompression circuit 32, and writing the compressed image data in the recording medium 150 or 160.

Reference numeral 66 denotes an image display ON/OFF switch which can set ON/OFF of the image display unit 28. With this function, when current supply to the image display unit 28 comprising the TFT-LCD and the like is cut off upon shooting using the optical viewfinder 104, power savings can be attained. Reference numeral 68 denotes a quick review ON/OFF switch which sets a quick review function that automatically plays back captured image data immediately after imaging. Note that this embodiment comprises a function of setting the quick review function when the image display unit 28 is OFF. Reference numeral 353 denotes an image position designation operation unit which is used to designate the position on an image of a color capture frame 802 (FIG. 8) displayed on the image display unit 28 in the color conversion mode to be described later. Upon operation of the operation unit 353, the color capture frame 802 can be moved to an arbitrary position in, e.g., upper, lower, right, left, and oblique directions.

Reference numeral 70 denotes a console including various buttons, touch panel, and the like. The console 70 includes a menu button, set button, macro button, multi-frame playback new page button, strobe setting button, single-shot/continuous-shot/self-timer select button, menu move + (plus) button, menu move − (minus) button, playback image move + (plus) button, playback image move − (minus) button, captured image quality select button, exposure correct button, date/time setting button, and the like.

Reference numeral 80 denotes a power supply control circuit which is comprised of a battery detection circuit, DC-DC converter, switch circuit for switching blocks to be energized, and the like. The power supply control circuit 80 detects the presence/absence, type, and remaining battery amount of a battery attached. Also, the power supply control circuit 80 controls the DC-DC converter (not shown) on the basis of such detection results and an instruction from the system control circuit 50, and supplies a required voltage to the respective units including the recording media for a required period of time. Reference numerals 82 and 84 denote connectors. Reference numeral 86 denotes a power supply circuit which includes a primary battery such as an alkali battery, lithium battery, or the like, a secondary battery such as an NiCd battery, NiMH battery, Li battery, or the like, an AC adapter, and the like.

Reference numerals 90 and 94 denote interfaces which connect recording media such as a memory card, hard disk, and the like to a bus inside the apparatus. Reference numerals 92 and 96 denote connectors which connect recording media such as a memory card, hard disk, and the like. Reference numeral 98 denotes a storage medium attachment/detachment detector which detects whether or not the recording medium is attached to the connector 92 or 96.

Note that this embodiment has two sets of interfaces and connectors that receive the recording media. However, the number of sets of interfaces and connectors that receive the recording media is not particularly limited. Also, combinations of interfaces and connectors of different standards may be used. As the interface and connector, those complying with the standards of a PCMCIA card, CF (compact storage device (Compact Flash®)) card, and the like may be used.

Furthermore, when the interfaces 90 and 94, and connectors 92 and 96 use those complying with the standards of a PCMCIA card, CF card, and the like, various communication cards can be connected. Such communication cards include, for example, a LAN card, modem card, USB card, IEEE1394 card, P1284 card, SCSI card, PHS, and the like. By connecting such communication cards, the imaging apparatus 100 can exchange image data and associated management information with another computer or its peripheral devices such as a printer and the like.

Reference numeral 102 denotes a protection member. The protection member 102 serves as a barrier which covers an imaging unit including the lens 10 of the imaging apparatus 100 to protect it from contamination and damage. Reference numeral 104 denotes an optical viewfinder. Imaging can be done using the optical viewfinder 104 alone without using the electronic viewfinder function implemented by the image display unit 28. In the optical viewfinder 104, some functions of the indication unit 54, e.g., an in-focus indication, camera shake alert indication, strobe charging indication, shutter speed indication, aperture value indication, exposure correction indication, and the like are provided.

Reference numeral 110 denotes a communication circuit having various communication functions such as RS232C, USB, IEEE1394, P1284, SCSI, modem, LAN, wireless communication, and the like. Reference numeral 112 denotes a connector, which connects the imaging apparatus (communication unit 110) to another apparatus. When the communication unit 110 makes wireless communications, 112 serves as an antenna.

Reference numeral 150 (160) denotes a recording medium such as a memory card, hard disk, or the like. The recording medium 150 (160) comprises a recording unit 152 (162) comprised of a semiconductor memory, magnetic disk, or the like, an interface 154 (164) with the imaging apparatus 100, and a connector 156 (166) for connecting the image processing apparatus 100.

FIG. 2 is a perspective view of the imaging apparatus 100 (digital camera in this embodiment). A power switch 201 is a button used to turn on/off the power supply. A mode change lever 202 serves as the mode switch 60, and is used to switch and set various function modes such as an imaging mode, play mode, moving image capture mode, still image capture mode, and the like. A shutter button 203 serves as the aforementioned shutter switches 62 and 64. An LCD 204 forms a part of the image display unit 28 to serve as an electronic viewfinder, and displays a screen obtained by playing back a captured still image and/or moving image. A menu button 205 is a switch used to turn on/off a menu screen required to change imaging parameters and camera settings. A set button 206 is used in selection, determination, and the like on the menu screen displayed upon operation of the menu button 205. A delete button 207 is used to designate deletion of an image. A display button 208 forms the aforementioned image display ON/OFF switch 66, and is used to switch the presence/absence of display on the LCD 204. A cross key 209 can be used to shift items on the menu screen using its up, down, right, and left buttons, and to shift images by pressing its right or left button in the play mode. Note that the menu button 205, set button 206, delete button 207, and cross key 209 form a part of the console 70.

Figure 3:
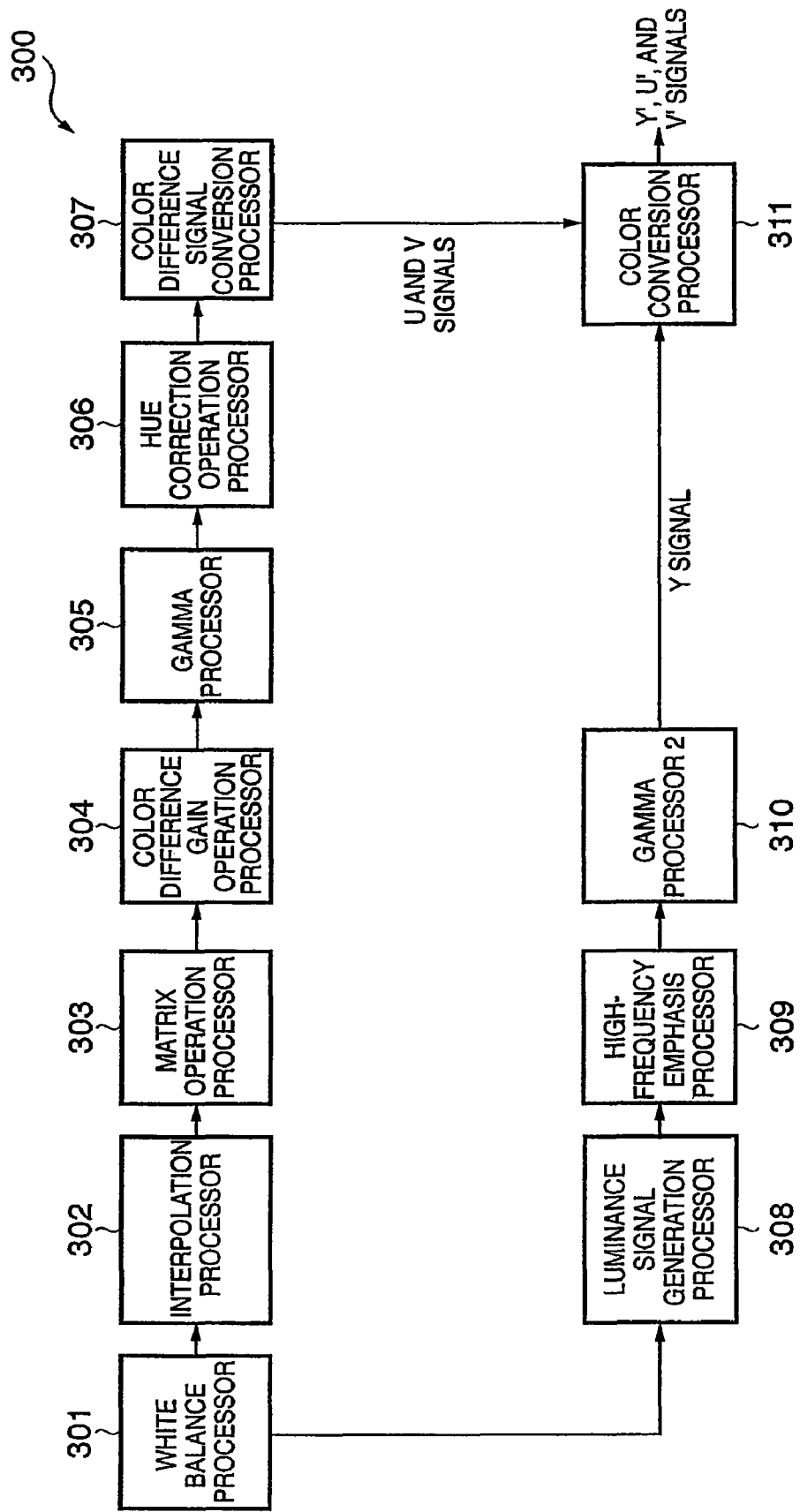
FIG. 3 is a diagram for explaining image processing according to the embodiment of the present invention.

FIG. 3 is a block diagram for explaining the functions and processing of the color conversion circuit 300 in the image processing circuit 20 in the digital camera 100 according to this embodiment. Note that parameter values used in respective processes to be described below (parameters for matrix operations and those of a three-dimensional (3D) lookup table) are stored in the memory 30, and are read out by the color conversion circuit 300 as needed. A CCD digital signal which is A/D-converted by the A/D converter 16 undergoes white balance processing by a white balance processor 301 first. A description of the white balance processing will be omitted here, but the processing can be implemented using a method described in, e.g., Japanese Patent Laid-Open No. 2003-244723. The CCD digital signal that has undergone the white balance processing is supplied to an interpolation processor 302. Assume that the imaging element 14 of this embodiment has a color filter of a Bayer matrix, as shown in FIG. 5. Therefore, the interpolation processor 302 executes processing for converting CCD Bayer matrix data shown in FIG. 5 into interpolated data R, G1, G2, and B shown in FIG. 6. The interpolated CCD digital signal is input to a matrix operation processor 303, and undergoes a 4×3 matrix operation given by:

$$\begin{vmatrix} Rm \\ Gm \\ Bm \end{vmatrix} = \begin{vmatrix} M11 & M21 & M31 & M41 \\ M12 & M22 & M32 & M42 \\ M13 & M23 & M33 & M43 \end{vmatrix} \begin{vmatrix} R \\ G1 \\ G2 \\ B \end{vmatrix} \quad (1)$$

to obtain Rm, Gm, and Bm.

The CCD digital signal that has undergone the matrix operation processing is input to a color difference gain operation processor 304, which multiplies color difference signals by a gain. That is, the Rm, Gm, and Bm signals are converted into Y, Cr, and Cb signals by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rm \\ Gm \\ Bm \end{vmatrix} \quad (2)$$

Then, the obtained Cr and Cb signals are multiplied by a gain according to:

$$Cr' = G1 \times Cr$$

$$Cb' = G1 \times Cb \quad (3)$$

After that, these signals are converted into Rg, Gg, and Bg signals by an inverse matrix operation of formula (2), i.e., by:

$$\begin{vmatrix} Rg \\ Gg \\ Bg \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (4)$$

The CCD digital signal that has undergone the color difference gain operation processing is sent to a gamma processor 305. The gamma processor 305 performs gamma conversion of the CCD digital signal using:

$$Rt = \text{GammaTable}[Rg] \quad (5)$$

$$Gt = \text{GammaTable}[Gg] \quad (6)$$

$$Bt = \text{GammaTable}[Bg] \quad (7)$$

where GammaTable is a one-dimensional (1D) lookup table.

The CCD digital signal that has undergone the gamma processing is sent to a hue correction operation processor 306. The hue correction operation processor 306 converts the Rt, Gt, and Bt signals into Y, Cr, and Cb signals by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rt \\ Gt \\ Bt \end{vmatrix} \quad (8)$$

Furthermore, the hue correction operation processor 306 corrects the Cr and Cb signals by:

$$\begin{vmatrix} Cr' \\ Cb' \end{vmatrix} = \begin{vmatrix} H11 & H21 \\ H12 & H22 \end{vmatrix} \begin{vmatrix} Cr \\ Cb \end{vmatrix} \quad (9)$$

After that, the hue correction operation processor 306 converts these signals into Rh, Gh, and Bh signals by an inverse matrix operation of formula (10), i.e., by:

$$\begin{vmatrix} Rh \\ Gh \\ Bh \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (10)$$

The CCD digital signal which has been processed by the hue correction operation processor 306 is sent to a color difference signal conversion processor 307. The color difference signal conversion processor 307 generates U and V signals from the Rh, Gh, and Bh signals using:

$$\begin{vmatrix} U \\ V \end{vmatrix} = \begin{vmatrix} -0.169 & -0.333 & 0.502 \\ 0.499 & -0.421 & -0.078 \end{vmatrix} \begin{vmatrix} Rh \\ Gh \\ Bh \end{vmatrix} \quad (11)$$

Figure 7:
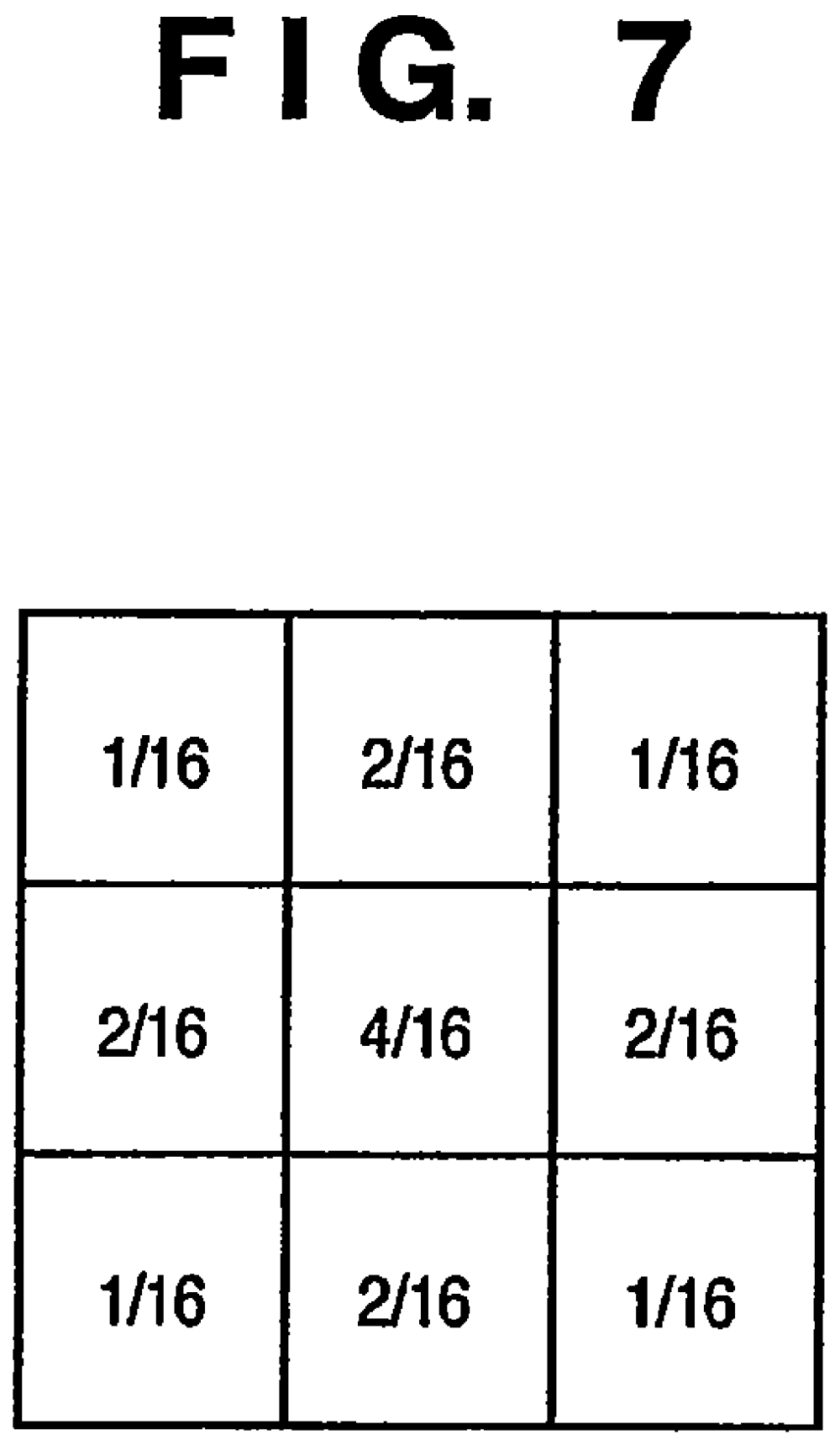

On the other hand, the CCD digital signal that has undergone the white balance processing by the white balance processor 301 is also supplied to a luminance signal generation processor 308. The luminance signal generation processor 308 converts the CCD digital signal into a luminance signal. For example, in case of a primary color filter shown in FIG. 5, a luminance signal is obtained by setting all R and B signal components to be zero, and applying two-dimensional (2D) filter processing with coefficients shown in FIG. 7. Note that, in case of a complementary color filter, a luminance signal is obtained by directly applying the 2D filter processing with coefficients shown in FIG. 7. The luminance signal generated by the luminance signal generation processor 308 undergoes edge emphasis processing by a high-frequency emphasis processor 309, and also undergoes gamma conversion processing by a gamma processor 310 to generate a Y signal.

The Y signal output from the gamma processor 310 and the U and V signals output from the color difference signal conversion processor 307 are converted into Y', U', and V' signals by a color conversion processor 311. The color conversion processor 311 executes conversion processing using a 3D lookup table. Details of this processing will be described later.

Figure 8:
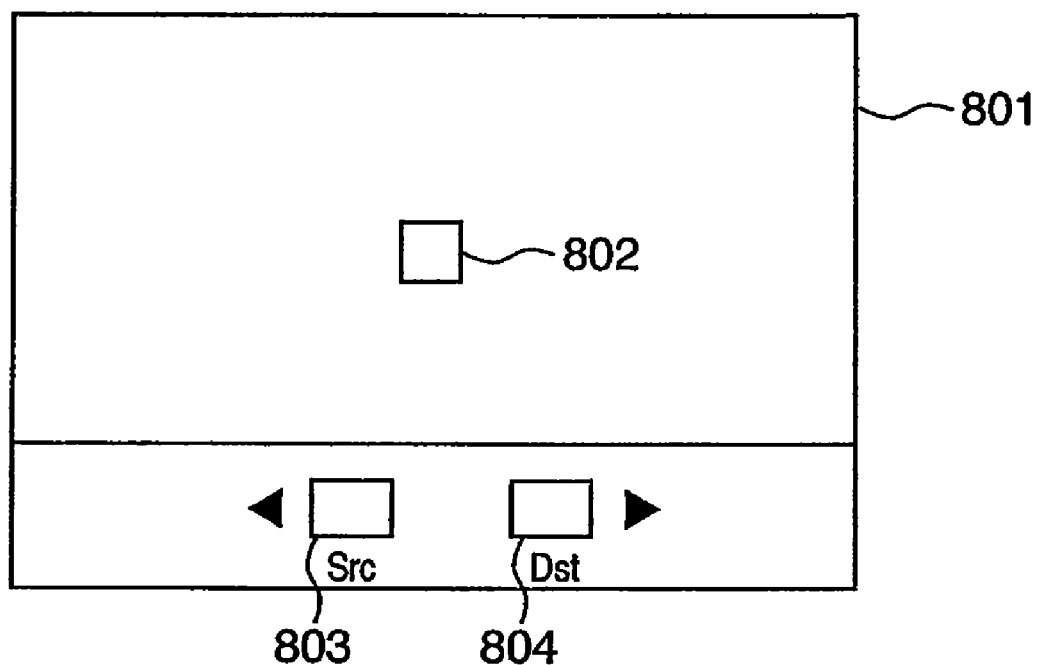
FIG. 8 shows an EVF screen example in a conversion source color/conversion destination color capture mode according to the embodiment of the present invention.

The digital camera (imaging apparatus 100) of this embodiment has an imaging mode (to be referred to as a color conversion mode hereinafter) that can convert an arbitrary color designated by the user into another arbitrary color designated by the user. In this color conversion mode, an electronic viewfinder (EVF) screen 801 shown in FIG. 8 is displayed on the LCD 204. By making a predetermined operation while a desired color in a captured image which is displayed on the screen 801 in real time, falls within a color capture frame 802, the image color within the color capture frame 802 is determined as a conversion source color or conversion destination color. After the conversion source color and conversion destination colors are determined, a lookup table of the color conversion processor 311 is set so as to convert the determined conversion source color into the conversion destination color. As a result, an image displayed on the EVF screen 801 and a captured image recorded upon operation of the shutter button 203 become those in which the conversion source color is converted into the conversion destination color. The color conversion mode of this embodiment will be described in detail below.

Figure 9:
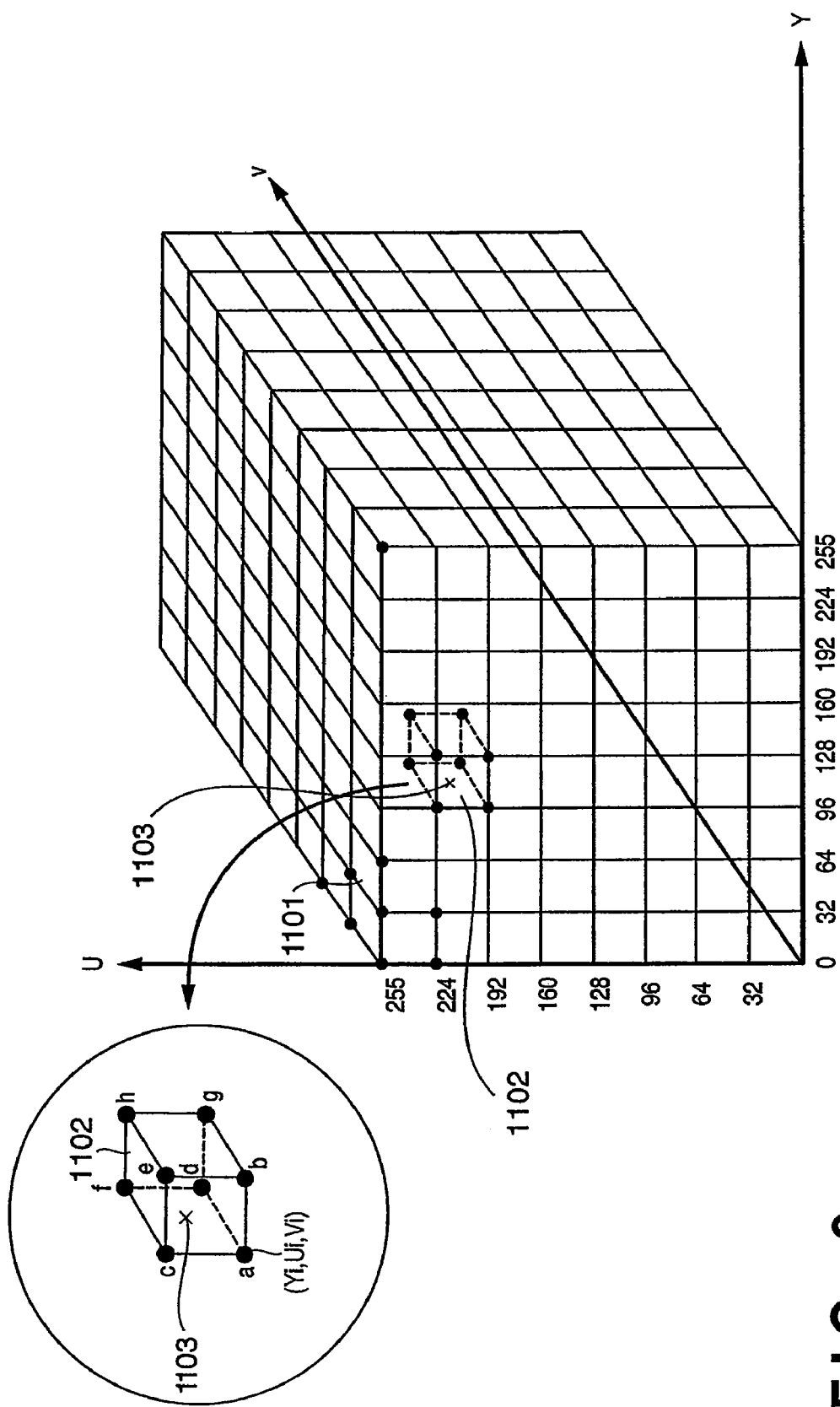
FIG. 9 is a view for explaining color conversion processing by a three-dimensional (3D) lookup table.

The color conversion processing from the conversion source color into the conversion destination color in the color conversion mode will be described first. The color conversion processor 311 converts Y, U, and V signals into Y', U', and V' signals by the 3D lookup table. In this embodiment, in order to reduce the 3D lookup table size, a list (lookup table) of Y, U, and V values of 729 (=9×9×9) 3D representative grid points obtained by dividing ranges from a minimum value to a maximum value of Y, U, and V signals into 8 are prepared. Note that Y, U, and V signals other than those at the representative grid points are calculated by interpolation. FIG. 9 conceptually shows a 3D lookup table of this embodiment. At each grid point, converted Y, U, and V values are set. For example, a grid point 1101 is a point of (32, 255, 32), and the values (32, 255, 32) are assigned to the grid point 1101 if values before and after conversion remain unchanged. On the other hand, if the grid point 1101 assumes values (32, 230, 28) after conversion, these values are set at the grid point 1101.

For example, Y, U, and V values at a point 1103 in a cubic grid 1102 in FIG. 9 are calculated by interpolation operations from Y, U, and V values at respective grid points (a to h) corresponding to the vertices of the cubic grid 1102. The interpolation operations are implemented by:

$$Y = Y_i + Y_f$$

$$U = U_i + U_f$$

$$V = V_i + V_f$$

$$\begin{aligned}
Yout(Y, U, V) &= Yout(Y_i + Y_f, U_i + U_f, V_i + V_f) = \\
&\quad (Yout(Y_i, U_i, V_i) \times (\text{Step} - Y_f) \times (\text{Step} - U_f) \times (\text{Step} - V_f) + \\
&\quad Yout(Y_i + \text{Step}, U_i, V_i) \times (Y_f) \times (\text{Step} - U_f) \times (\text{Step} - V_f) + \\
&\quad Yout(Y_i, U_i + \text{Step}, V_i) \times (\text{Step} - Y_f) \times (U_f) \times (\text{Step} - V_f) + \\
&\quad Yout(Y_i, U_i, V_i + \text{Step}) \times (\text{Step} - Y_f) \times (\text{Step} - U_f) \times (V_f) + \\
&\quad Yout(Y_i + \text{Step}, U_i + \text{Step}, V_i) \times (Y_f) \times (U_f) \times (\text{Step} - V_f) + \\
&\quad Yout(Y_i + \text{Step}, U_i, V_i + \text{Step}) \times (Y_f) \times (\text{Step} - U_f) \times (V_f) + \\
&\quad Yout(Y_i, U_i + \text{Step}, V_i + \text{Step}) \times (\text{Step} - Y_f) \times (U_f) \times (V_f) + \\
&\quad Yout(Y_i + \text{Step}, U_i + \text{Step}, V_i + \text{Step}) \times (Y_f) \times (U_f) \times (V_f)) / \\
&\quad (\text{Step} \times \text{Step} \times \text{Step})
\end{aligned} \quad (12)$$

$$\begin{aligned}
Uout(Y, U, V) &= Uout(Y_i + Y_f, U_i + U_f, V_i + V_f) = \\
&\quad (Uout(Y_i, U_i, V_i) \times (\text{Step} - Y_f) \times (\text{Step} - U_f) \times (\text{Step} - V_f) + \\
&\quad Uout(Y_i + \text{Step}, U_i, V_i) \times (Y_f) \times (\text{Step} - U_f) \times (\text{Step} - V_f) + \\
&\quad Uout(Y_i, U_i + \text{Step}, V_i) \times (\text{Step} - Y_f) \times (U_f) \times (\text{Step} - V_f) + \\
&\quad Uout(Y_i, U_i, V_i + \text{Step}) \times (\text{Step} - Y_f) \times (\text{Step} - U_f) \times (V_f) + \\
&\quad Uout(Y_i + \text{Step}, U_i + \text{Step}, V_i) \times (Y_f) \times (U_f) \times (\text{Step} - V_f) + \\
&\quad Uout(Y_i + \text{Step}, U_i, V_i + \text{Step}) \times (Y_f) \times (\text{Step} - U_f) \times (V_f) + \\
&\quad Uout(Y_i, U_i + \text{Step}, V_i + \text{Step}) \times (\text{Step} - Y_f) \times (U_f) \times (V_f) + \\
&\quad Uout(Y_i + \text{Step}, U_i + \text{Step}, V_i + \text{Step}) \times (Y_f) \times (U_f) \times (V_f)) / \\
&\quad (\text{Step} \times \text{Step} \times \text{Step})
\end{aligned} \quad (13)$$

-continued $$\begin{aligned}Vout(Y, U, V) = Vout(Yi + Yf, Ui + Uf, Vi + Vf) = \\ (Vout(Yi, Ui, Vi) \times (\text{Step} - Yf) \times (\text{Step} - Uf) \times (\text{Step} - Vf) + \\ Vout(Yi + \text{Step}, Ui, Vi) \times (Yf) \times (\text{Step} - Uf) \times (\text{Step} - Vf) + \\ Vout(Yi, Ui + \text{Step}, Vi) \times (\text{Step} - Yf) \times (Uf) \times (\text{Step} - Vf) + \\ Vout(Yi, Ui, Vi + \text{Step}) \times (\text{Step} - Yf) \times (\text{Step} - Uf) \times (Vf) + \\ Vout(Yi + \text{Step}, Ui + \text{Step}, Vi) \times (Yf) \times (Uf) \times (\text{Step} - Vf) + \\ Vout(Yi + \text{Step}, Ui, Vi + \text{Step}) \times (Yf) \times (\text{Step} - Uf) \times (Vf) + \\ Vout(Yi, Ui + \text{Step}, Vi + \text{Step}) \times (\text{Step} - Yf) \times (Uf) \times (Vf) + \\ Vout(Yi + \text{Step}, Ui + \text{Step}, Vi + \text{Step}) \times (Yf) \times (Uf) \times (Vf))/ \\ (\text{Step} \times \text{Step} \times \text{Step})\end{aligned}$$ (14)

where Y, U, and V are the input Y, U, and V signals, and Yout(Y, U, V), Uout(Y, U, V), and Vout(Y, U, V) are the output Y, U, and V signals at that time. Also, Yi, Ui, and Vi are signals at a representative grid point (a in FIG. 9) whose values are smaller than Y, U, and V signal values of the input Y, U, and V signals, and are closest to these signal values. Furthermore, Yout(Yi, Ui, Vi), Uout(Yi, Ui, Vi), and Vout(Yi, Ui, Vi) are representative grid point output signals, and Step (=32 in this embodiment) is the step width of representative grid points. Therefore, for example, signals at a grid point b are expressed by Yi+Step, Ui, and Vi, and signals at a grid point c are expressed by Yi, Ui+Step, and Vi.

In the following description, the lookup table conversion and interpolation operation formulas given by formulas (12), (13), and (14) are simply expressed by:

$$(Yout, Uout, Vout) = LUT[(Y, U, V)]$$ (15)

where Y, U, and V are input signal values, LUT is the 9×9×9 lookup table shown in FIG. 9. Also, Yout, Uout, and Vout are the results (Y', U', and V' in FIG. 3) of the lookup table conversion and interpolation operations. That is, the color conversion processor 311 executes the conversion processing given by formula (15) above.

As described above, after the conversion source color and conversion destination color are determined in the color conversion mode, a cubic grid which includes the conversion source color is determined, and the values of respective grid points which form the cubic grid are changed to have the conversion destination color at the coordinate position of the conversion source color. For example, assume that the conversion source color determined in FIG. 9 has Y, U, and V values at a grid point 1103. In this case, the values of grid points a to h of the cubic grid 1102 are changed so that the Y, U, and V values at the point 1103 become those of the set conversion destination color upon execution of the interpolation processing described by formula (15). Although a detailed description of this processing will be omitted, the values of representative grid points after the change are mathematically calculated. The color conversion processor 311 executes the color conversion processing using the 3D lookup table after the change. In the following description, such changes in value of grid points will be referred to as parameter settings.

As described above, since color conversion is done by determining grid point data of the 3D lookup table on the basis of the designated conversion source color and conversion destination color, a color setting of user's choice can be easily given to an image to be played back. In the above color conversion processing, only representative grid points near the color to be changed are changed. For this reason, not all colors in the image but only some colors can be easily and quickly converted into those of user's choice. That is, since no parameters which are used in the matrix operation processor 303, color difference signal gain operation processor 304, gamma processor 305, hue correction operation processor 306, and the like are changed, only a desired color (color region) can be changed.

Figure 4:
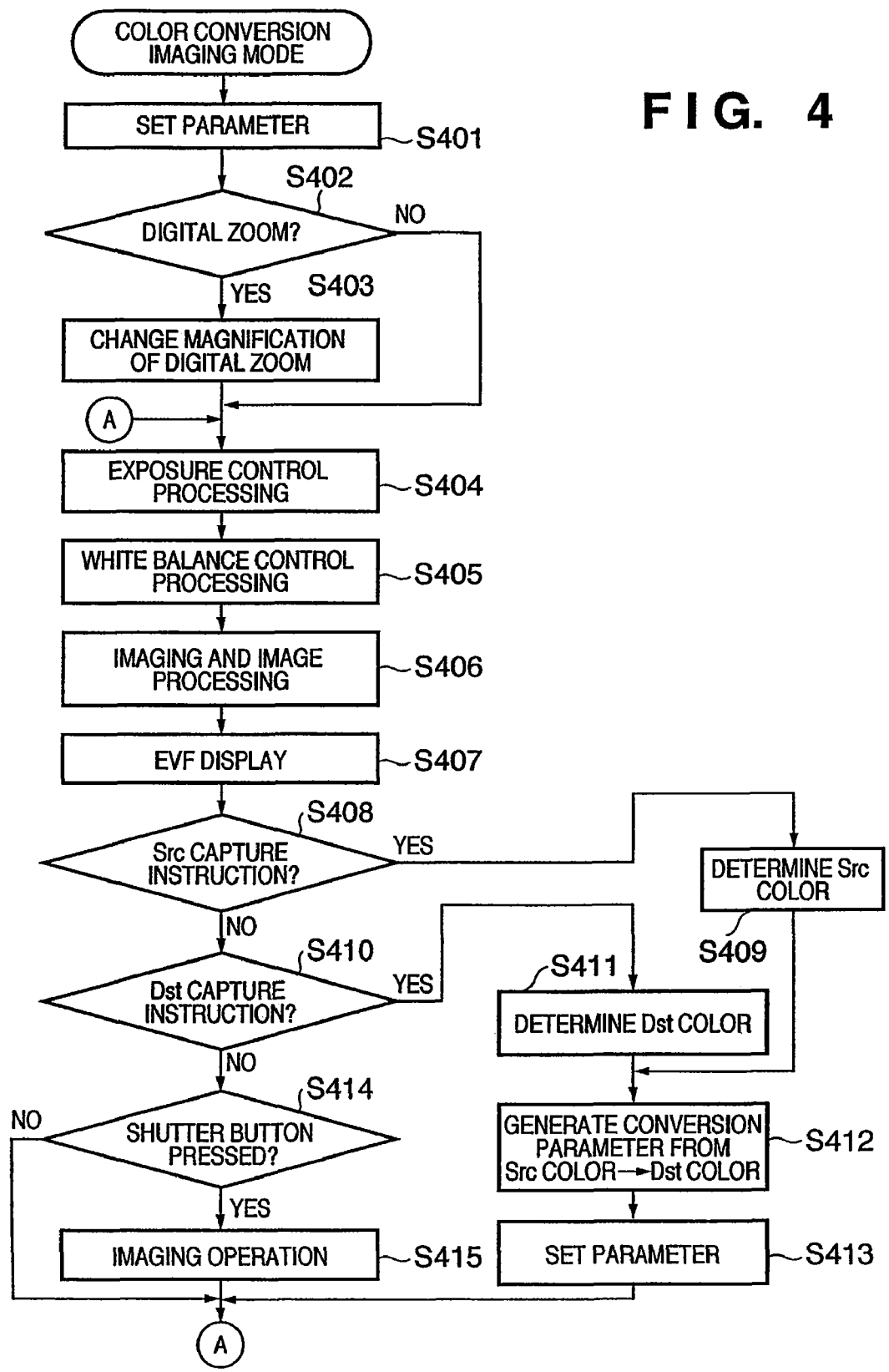
FIG. 4 is a flowchart for explaining processing in a color conversion mode according to the first embodiment of the present invention.

FIG. 4 is a flowchart for explaining the processing of the digital camera of this embodiment (by the system control circuit 50) upon imaging in the color conversion mode. Since a normal imaging mode other than the color conversion mode is the same as that in the operation of a general digital camera, a description will be limited to that of the color conversion mode.

The user can set the aforementioned color conversion mode by manipulating the imaging mode of the digital camera upon operation of the mode switch 60. When the imaging apparatus 100 enters the color conversion mode, previous setting parameters set in the previous color conversion mode are set as those of the color conversion processor 311 in step S401. The reason why the previous setting parameters are set in step S401 is that some users always use the color conversion mode to convert a color A into a color B (for example, a given sky color into another sky color). In such case, the previous conversion source color and conversion destination color are preferably displayed in a conversion source color display frame 803 and conversion destination color display frame 804. Note that the processing of step S401 is not indispensable, and may be optional.

In the color conversion mode, the aforementioned conversion source color and conversion destination color are determined using an image displayed on the electronic viewfinder. Therefore, in the color conversion mode, a live image captured by the imaging element 14 via the imaging lens 10 is displayed on the LCD 204 of the image display unit 28, and the electronic viewfinder function is enabled. It is checked in step S402 if the live image displayed on the image display unit 28 has undergone the enlargement display processing (to be referred to as digital zoom hereinafter) including pixel interpolation processing and the like. In this embodiment, digital zoom is implemented by the enlargement display circuit 352 in the image processing circuit 20. If digital zoom is executed, the flow advances from step S402 to step S403. In step S403, the system control circuit 50 sends an instruction to the enlargement display circuit 352 to change the digital zoom magnification to a predetermined value or less (to at least a current enlargement magnification or less) or to cancel digital zoom to return to equal-magnification display (magnification=1). "Equal magnification" indicates a state equivalent to the number of pixels of the imaging element or that of the live image input to the display unit. On the other hand, if the live image displayed on the image display unit 28 has not undergone digital zoom, the flow directly jumps from step S402 to step S404.

The system control circuit 50 checks in step S404 if an exposure control start timing is reached. If the exposure control start timing is reached, the system control circuit 50 executes the exposure processing using the exposure control circuit 40. This exposure processing includes exposure settings required to display a live image on the EVF. If this exposure processing is executed frequently, it causes flickering of the screen. Hence, the execution interval of the exposure processing is set based on a time constant. For example, the time constant is set to execute the exposure processing once per two sec. Therefore, the exposure processing in step S404 is done at this interval.

The system control circuit 50 checks in step S405 if a white balance control start timing is reached. If the white balance control start timing is reached, the system control circuit 50 executes white balance control processing. Since the white balance control processing is executed frequently, it also causes flickering of the screen as in the exposure processing. Hence, the time constant is set to execute the white balance control processing, e.g., once per five sec. In the white balance control processing, white balance coefficients required to execute white balance processing are obtained to update those used in the image processing circuit 20 (color conversion circuit 300).

In step S406, imaging is executed to have an aperture value set in the exposure control in step S404, and the image processing circuit 20 applies image processing to a through image as a real-time output from the imaging element 14 using the white balance coefficients set in step S405. In step S407, the image data which has been captured and has undergone image processing in step S406 is displayed on the LCD 204 (image display unit 28) which serves as the EVF.

The EVF screen 801 shown in FIG. 8 is displayed on the LCD 204. In the color conversion mode, the LCD 204 displays the EVF screen 801, and color capture frame 802, conversion source color display frame 803, and conversion destination color display frame 804 within the EVF screen 801, as shown in FIG. 8. In the color conversion mode, settings of the conversion source color and conversion destination color by predetermined operations on the console 70 (steps S408 to S413), and capturing of an image upon depression of the shutter button 203 (steps S416 and S417) can be made.

How to set the conversion source color and conversion destination color will be described first. In order to designate the conversion source color, the user adjusts the direction and optical zoom of the camera to set a field angle so as to fully display a desired color within the color capture frame 802. Upon depression of, e.g., the left button of the cross key 209, it is determined that a conversion source color capture instruction is input, and the flow advances from step S408 to step S409. Pixel data of an image within the color capture frame 802 at that time are acquired using the color information acquisition circuit 351 in step S409, and their average value is determined as a conversion source color (Src color). After the conversion source color is determined, a patch indicating the conversion source color is displayed within the conversion source color display frame 803.

Likewise, in order to determine the conversion destination color, the user adjusts the camera to fully display a desired color within the color capture frame 802, and then presses the right button of the cross key 209. Upon depression of the right button of the cross key 209, it is determined that a conversion destination color capture instruction is input, and the flow advances from step S410 to step S411. Pixel data of an image within the color capture frame 802 at that time are acquired using the color information acquisition circuit 351 in step S411, and their average value is determined as a conversion destination color (Dst color). After the conversion source color is determined, a patch indicating the conversion destination color is displayed within the conversion destination color display frame 804.

Note that the average of pixel values within the color capture frame 802 is calculated in steps S409 and S411. Pixel data used in average calculation may be either image data decimated for display on the electronic viewfinder (image data stored in the image display memory 24) or image data stored in the memory 30.

After the conversion source color or conversion destination color is determined in step S409 or S411, the flow advances to step S412. In step S412, conversion parameters required to convert the conversion source color into the conversion destination color are determined. Note that the parameters are determined only when both the conversion source color and conversion destination color are determined. In this embodiment, as has been described above using FIG. 9 and the like, the change values of grid points which form a cubic grid that includes the conversion source color of the 3D lookup table are determined. In step S413, the 3D lookup table of the color conversion processor 311 is updated. In the subsequent image display processing (steps S406 and S407) for the EVF and image processing of the image processing circuit 20 upon execution of imaging (step S415), the 3D lookup table updated in the color conversion processor 311 is used. Upon execution of imaging, a signal SW1 is generated at the half-stroke position of the shutter button 203 to execute AF (autofocus) processing, AE (auto exposure control) processing, AWB (auto white balance) processing, EF (flash pre-emission) processing, and the like for imaging. A signal SW2 is generated at the full-stroke position of the shutter button 203 to execute a series of imaging processes.

Note that the image position designation unit 353 may be used to move an index (color capture frame 802) for designating the position in an image displayed on the image display unit 28, or to change its size. In this embodiment, color information included in the color capture frame 802 is acquired from an image (live image) displayed on the EVF. For this reason, by changing the direction of the imaging apparatus 100 itself or by adjusting optical zoom, a desired relationship between the color capture frame 802 and the position/size of the displayed image can be set. By contrast, when the image position designation unit 353 may allow to move the color capture frame 802 or to change its size, a desired color can be designated even when an already captured image is displayed on the image display unit 28 to capture a color.

Various magnification change methods of digital zoom in step S403 are available. For example, (1) processing for forcibly returning the magnification to 1×(1:1), or (2) processing for dropping the currently set magnification by predetermined levels may be used. At this time, in either case, the magnification is changed to assure the number of pixels in the frame to be equal to or larger than the number of unit pixels (R, G1, G2, B) minimum required to reconstruct one color in the interpolation processor 302 in, e.g., the Bayer matrix in FIG. 5.

In the description of the embodiment, only one each conversion source color and conversion destination color are set. However, the present invention is not limited to this. For example, a plurality of combinations of conversion source colors and conversion destination colors may be set. When such plurality of combinations are set, representative points of a cubic grid that includes each conversion source color may be changed. When a plurality of conversion source colors fall within one cubic grid, for example, their vectors may be calculated, and the average of them may be used. In addition, both the conversion source color and conversion destination color are acquired from EVF display. Alternatively, if at least one of these colors is acquired from EVF display, the digital zoom control of this embodiment can exert its effect.

In this embodiment, the left and right buttons of the cross key 209 are used to capture the conversion source color and conversion destination color. However, the present invention is not limited to this. For example, such functions may be assigned to other operation buttons, or dedicated buttons may be provided.

The arithmetic processing of the color conversion processor 311 in this embodiment uses the 3D lookup table processing and interpolation arithmetic processing. However, the present invention is not limited to these. Processing that can convert the conversion source color into the conversion destination color, e.g., matrix arithmetic processing for changing the coefficients of a matrix operation for each color space may be used in the arithmetic processing.

The processing using the matrix operation processing will be briefly explained below. In the above embodiment, Y, U, and V signal values after conversion are set on respective grid points in FIG. 9. By contrast, in the processing using the matrix operation processing, respective grid points store coefficients. M11 to M33 in formula (16) below. The coefficients M11 to M33 are determined in accordance with Yin, Uin, and Vin, and formula (16) is calculated to obtain Yout, Uout, and Vout. Note that as determination of M11 to M33, a coefficient stored at a grid point closest to Yin, Uin, and Vin may be calculated, or a coefficient may be calculated by interpolation operations from respective grid points.

$$\begin{vmatrix} Yout \\ Uout \\ Vout \end{vmatrix} = \begin{vmatrix} M11 & M12 & M13 \\ M21 & M22 & M23 \\ M31 & M32 & M33 \end{vmatrix} \begin{vmatrix} Yin \\ Uin \\ Vin \end{vmatrix} \quad (16)$$

As described above, according to the first embodiment, since the magnification of digital zoom is reduced in the color conversion mode, the number of pixels within the color capture frame can be appropriately maintained, and color conversion with high precision can be implemented.

Second Embodiment

In the first embodiment, when a captured live image is displayed at an enlargement magnification by digital zoom of the enlargement display circuit 352, a display is performed by canceling digital zoom, or lowering the enlargement magnification. In the second embodiment, in order to assure a predetermined number or more of pixels within the color capture frame 802, when the enlargement magnification of digital zoom is equal to or higher than a given threshold, that enlargement magnification is changed to that as the threshold.

Figure 10:
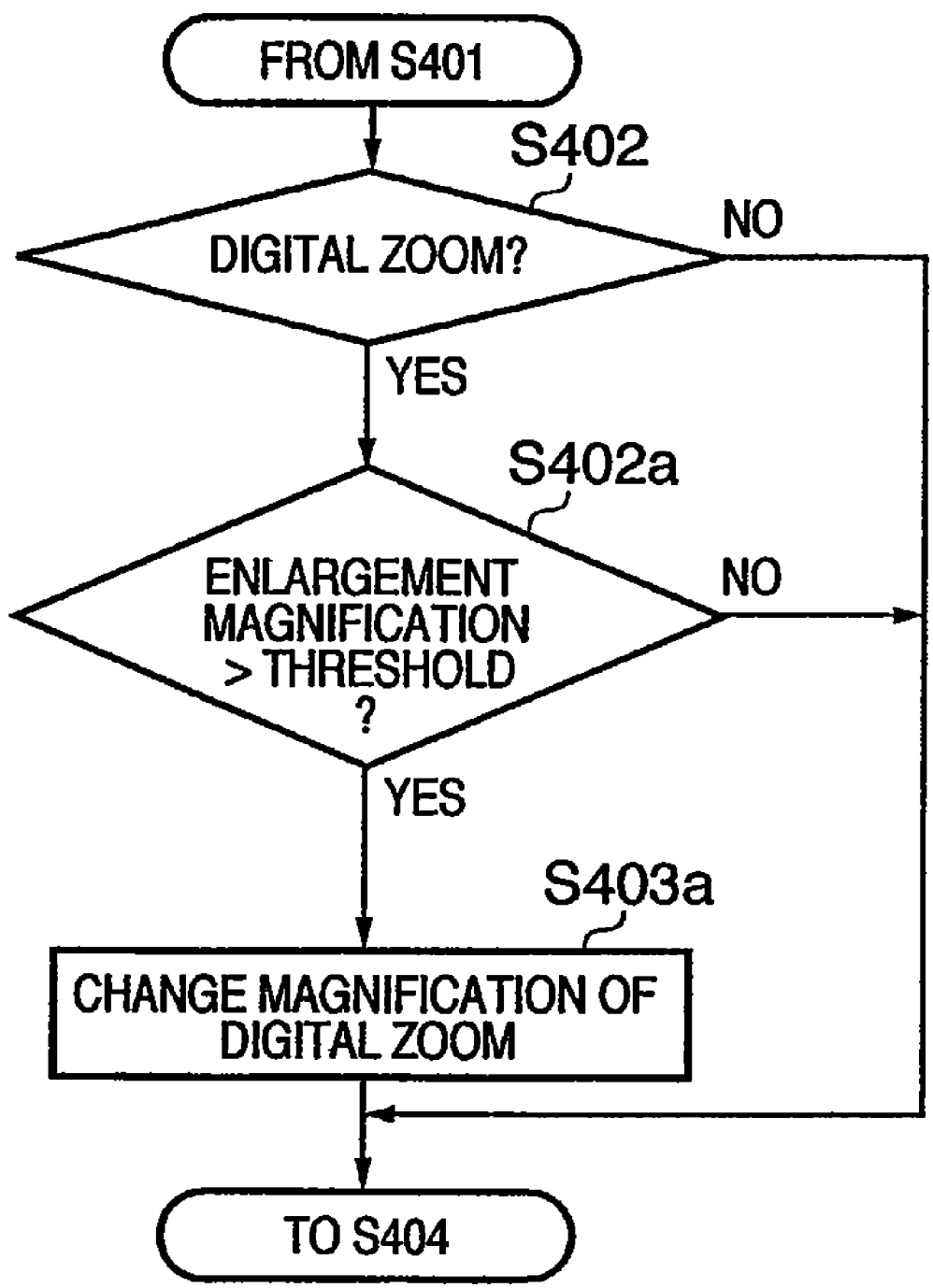
FIG. 10 is a flowchart for explaining processing in a color conversion mode according to the second embodiment of the present invention.

In the second embodiment, the processes in steps S402 and S403 described in the first embodiment are changed, as shown in FIG. 10. FIG. 10 is a flowchart for explaining the processing in the color conversion mode according to the second embodiment. Referring to FIG. 10, it is checked in step S402 if digital zoom is enabled. If digital zoom is disabled, the flow directly jumps to step S404. If digital zoom is enabled, the flow advances from step S402 to step S402a to check if the enlargement magnification exceeds a threshold. If the enlargement magnification does not exceed the threshold, the flow directly jumps to step S404. That is, the enlargement magnification of digital zoom is maintained. On the other hand, if the enlargement magnification exceeds the threshold, the flow advances to step S403a to change the magnification of digital zoom to a predetermined magnification (a magnification set as the threshold).

As described above, according to the second embodiment, if the magnification of digital zoom is equal to or lower than the threshold, that magnification is maintained. Hence, if the magnification is equal to or lower than the threshold, the operation in the color conversion mode that exploits digital zoom can be made. According to the second embodiment, both the conversion source color and conversion destination color are acquired from EVF display. Alternatively, if at least one of these colors is acquired from EVF display, the digital zoom control of this embodiment can exert its effect.

Third Embodiment

In the first and second embodiments, if the enlargement magnification of digital zoom is changed in step S403 or S403a, the state after change is maintained. The purpose of limiting the magnification of digital zoom is to assure a sufficient number of pixels within the color capture frame upon color capture and to improve the precision upon color capture. Hence, after the color capture processing has been done, the magnification of digital zoom may be returned.

Figure 11:
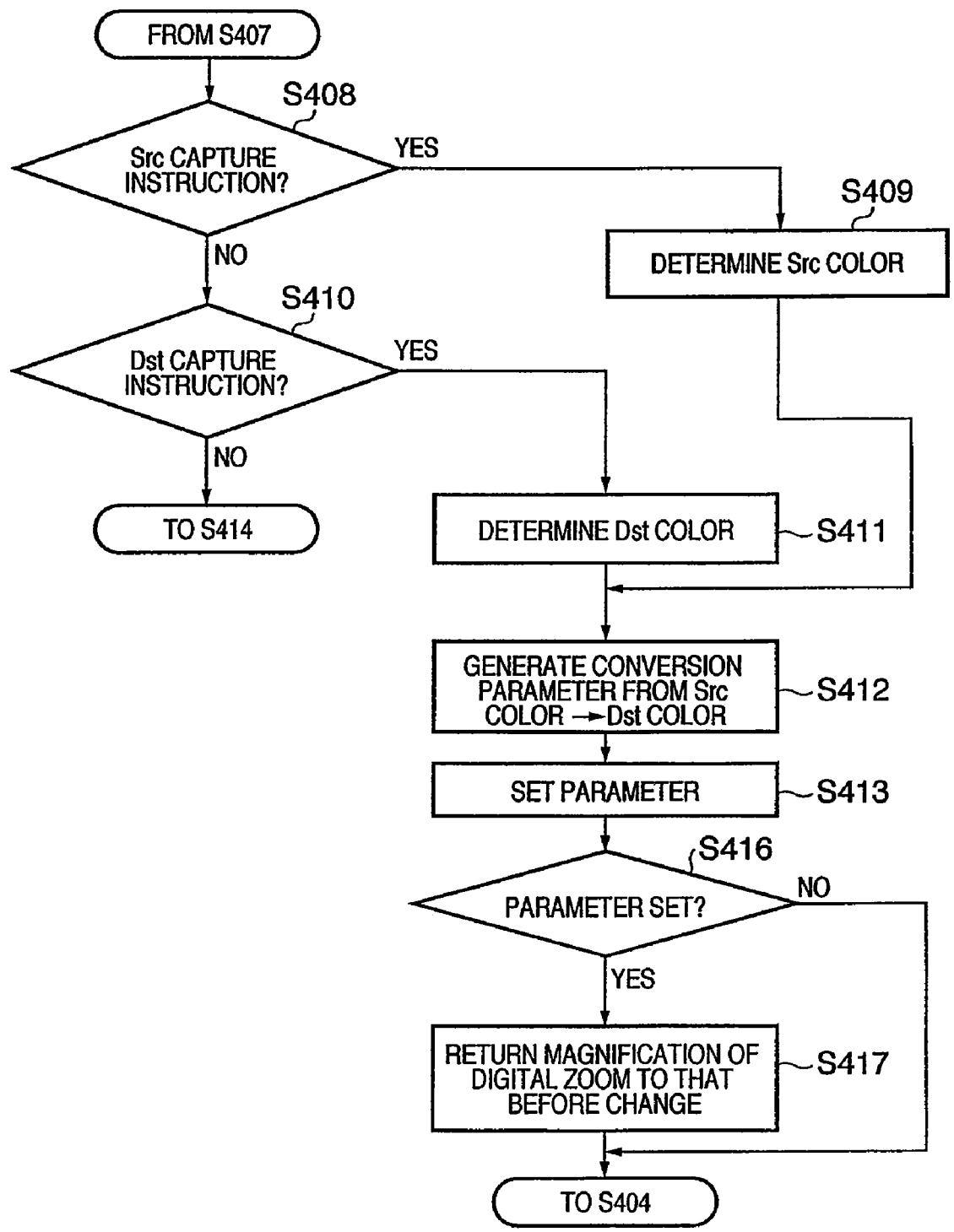
FIG. 11 is a flowchart for explaining processing in a color conversion mode according to the third embodiment of the present invention.

FIG. 11 is a flowchart for explaining the processing in the color processing mode according to the third embodiment. In the third embodiment, the processes in steps S408 to S413 in the first embodiment (FIG. 4) are replaced by those shown in FIG. 11. That is, upon completion of settings of the parameters based on the conversion source color (Src color) and conversion destination color (Dst color), the enlargement magnification of digital zoom is returned to that immediately before it is changed in step S403 (step S417). Note that the parameter setting in step S413 is executed only when both the conversion source color and conversion destination color are set. Therefore, it is checked if the parameter setting is done (step S416). If the parameter setting is done, the magnification of digital zoom is returned. As can be seen from the above description, the third embodiment can also be applied to the second embodiment. In this case, in step S417, the enlargement magnification of digital zoom is returned to that immediately before it is changed in step S403a (FIG. 10).

As described above, according to the third embodiment, while the precision upon color capture is assured in the color conversion mode, imaging can be made in a state wherein digital zoom at the enlargement magnification of user's choice can be made upon imaging.

Fourth Embodiment

In the first and second embodiments, the enlargement magnification of digital zoom is changed in step S403 or S403a. As described above, this is to assure a sufficient number of pixels within the frame when color information is to be captured without changing the size of the index (color capture frame 802) used to designate the color capture position. In order to assure a predetermined number or more of pixels within the frame, the size of the color capture frame 802 may be changed in correspondence with the enlargement magnification of digital zoom. That is, the size of the frame is changed to assure the number of pixels within the frame to be equal to or larger than the number of unit pixels (R, G1, G2, B) minimum required to reconstruct one color in the interpolation processor 302 in, e.g., the Bayer matrix in FIG. 5.

Figure 12:
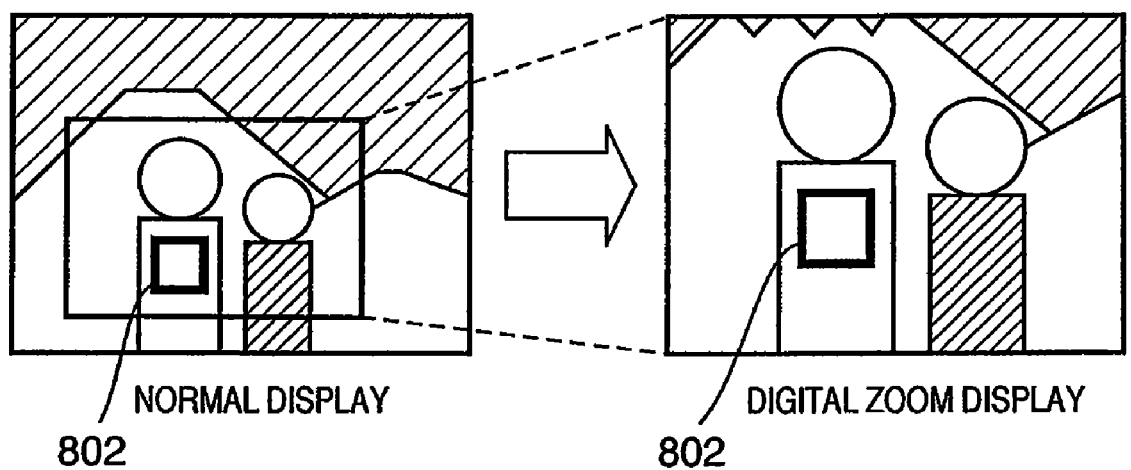
FIG. 12 is a view for explaining a deformation operation of a color capture frame according to the fourth embodiment of the present invention.

FIG. 12 is a view for explaining the size change control of the color capture frame 802 according to the fourth embodiment. The size change processing of the color capture frame 802 is executed in, e.g., step S403 or S403a in place of the magnification change processing of digital zoom. As shown in FIG. 12, the color capture frame 802 is enlarged in accordance with the enlargement magnification of digital zoom. Upon determination of colors in step S409 and S411, pixel values of all pixels within the color capture frame after size change are used.

As described above, according to the fourth embodiment, the magnification of digital zoom can be prevented from being changed forcibly. That is, color capture with high precision can be implemented using EVF display processed by digital zoom at a desired magnification.

Other Embodiments

In the above embodiments, the color information is acquired by changing the enlargement magnification of digital zoom, or by enlarging the size of the index used to designate the color capture position. Alternatively, these processes may be combined. That is, a predetermined number or more of pixels in the capture frame may be assured by combining the processing for changing the enlargement magnification and that for changing the size of the index. Alternatively, upon changing the enlargement magnification of digital zoom, the magnification of optical zoom may be changed to maintain the enlarged display state on the EVF as much as possible. That is, when the imaging lens 10 is an optical zoom lens whose focal length can be changed, digital zoom may be compensated for by optical zoom in, e.g., step S403 or S403*a*. More specifically, when 2× digital zoom is set, 2× optical zoom is set, and digital zoom is returned to 1×. That is, optical zoom is used in preference to digital zoom. By acquiring color information upon setting a zoom position where a captured object image becomes maximum, the frequency of occurrence of processing for changing to lower the enlargement magnification of digital zoom or enlarging the size of the index used to designate color capture position may be reduced. In this way, changes made to the display state on the EVF can be reduced, and the user can naturally perform a color capture operation. The zoom position where the object image becomes maximum corresponds to a maximum focal length of an optical system or the focal length (wide-angle end or middle position) where the size of an object becomes maximum in a macro mode.

In the above embodiments, both the conversion source color and conversion destination color are acquired from EVF display. However, the present invention is not limited to this. For example, a color sample image which is pre-stored in the nonvolatile memory 56 may be displayed on the image display unit 28, and a desired color sample may be selected by an instruction from the console 70 to designate the conversion destination color. In this case, the color capture processing using EVF display captures only the conversion source color. Hence, in, e.g., the third embodiment, the processing in step S416 is executed immediately after that in step S409 (determination of the conversion source color) to return the magnification of digital zoom. That is, in the above embodiments, both the conversion source color and conversion destination color are acquired from EVF display. Alternatively, the present invention can be applied to an arrangement that captures one of these colors. That is, when at least one of the conversion source color and conversion destination color is acquired from EVF display, the digital zoom control according to the first to third embodiments, and the color capture frame size control according to the fourth embodiment can exhibit their effects.

Also, when the recording media 150 and 160 are combined media that integrate a memory card, hard disk, and the like, no problem is posed. Furthermore, an arrangement in which some medium can be detachable from that combined medium may also be adopted, as a matter of course.

In the description of the above embodiments, the recording media 150 and 160 are separated from the imaging apparatus 100, and are arbitrarily connectable to it. Alternatively, one or all of these recording media may be fixedly mounted on the imaging apparatus 100. Also, one or a plurality of arbitrary number of recording media 150 or 160 may be connectable to the imaging apparatus. In the above description, the recording media 150 and 160 are mounted on the imaging apparatus 100. However, one or a plurality of combinations of recording media may be adopted.

In the description of this embodiment, the imaging apparatus adopts an arrangement for making settings of the conversion source color and conversion destination color (i.e., color capture), and applying the color conversion processing based on the conversion source color and conversion destination color to a captured image. However, as can be seen from the above description, such color conversion processing can be applied to image retouch processing by application software in an information processing apparatus (e.g., a personal computer or the like). For example, assume that a captured image is input to the personal computer or the like via a storage medium or a communication unit (not shown), and the conversion source color or conversion destination color is designated by moving the color capture frame using a mouse or the like upon retouching an image displayed on a monitor. In such case, when the image is displayed in an enlarged scale, processing for returning its size to the standard size (first embodiment) or changing its magnification to a predetermined magnification (second embodiment) is executed.

Furthermore, the same effects can be achieved by supplying a storage medium, which records a program code of a software program that can implement the functions of the above-mentioned embodiments to a system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

According to the present invention, since a color which is to undergo the color conversion processing can be precisely captured, the color conversion processing with high precision can be implemented.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-023938 filed on Jan. 31, 2005, which is hereby incorporated by reference herein in its entirety.

What is claimed is:

1. An image processing apparatus comprising:
an image display unit configured to display an image;
a color conversion unit configured to perform color conversion of color information in the image displayed on the image display unit, wherein the color conversion converts color information of a conversion source color existing in the image displayed on the image display unit into color information of a conversion destination color;
an acquisition unit configured to acquire color information from a predetermined area in the image displayed on the image display unit in a color conversion mode in which the color conversion unit operates;
a determination unit configured to determine the conversion source color and the conversion destination color, at least one of the conversion source color and the conversion destination color being determined based on the color information acquired by the acquisition unit;
an enlargement unit configured to enlarge the image to be displayed on the image display unit using a pixel interpolation processing;
an instruction unit configured to instruct an enlargement magnification to the enlargement unit; and
a control unit configured to limit the enlargement magnification instructed by the instruction unit to a value equal to or less than a predetermined value in the color conversion mode so that the predetermined number of pixels which are not interpolation-processed and used for the color conversion by the color conversion unit in the predetermined area of the enlarged image by pixel interpolation can be assured,
wherein in the color conversion mode, the enlargement unit enlarges the image at the enlargement magnification limited by the control unit, and wherein the color conversion unit, the acquisition unit, the determination unit, the enlargement unit, the instruction unit and the control unit are implemented by one or more processors.

2. The apparatus according to claim 1, wherein in the color conversion mode, the control unit sets the enlargement magnification to 1.

3. The apparatus according to claim 1, wherein in the color conversion mode, the control unit sets the enlargement magnification to a the predetermined value in a case that the enlargement magnification instructed by the instruction unit exceeds the predetermined value.

4. The apparatus according to claim 1, further comprising a returning unit configured to return the enlargement magnification controlled by the control unit to a state before control, after acquisition of the color information using the acquisition unit is done.

5. An image processing method comprising:
using a processor to perform:
an image display step of displaying an image on an image display unit;
a color conversion step of performing color conversion of color information in the image displayed on the image display unit, wherein the color conversion converts color information of a conversion source color existing in the image displayed on the image display unit into color information of a conversion destination color;
an acquisition step of acquiring color information from a predetermined area in the image displayed on the image display unit in a color conversion mode in which the color conversion is performed;
a determination step of determining the conversion source color and the conversion destination color, at least one of the conversion source color and the conversion destination color being determined based on the color information acquired in the acquisition step;
an enlargement step of enlarging the image to be displayed on the image display unit using a pixel interpolation processing; and
an instruction step of instructing an enlargement magnification used in the enlargement step;
a control step of limiting the enlargement magnification instructed in the instruction step to a value equal to or less than a predetermined value in the color conversion mode so that the predetermined number of pixels which are not interpolation-processed, and used for the color conversion in the color converstion step in the predetermined area of the enlarged image by pixel interpolation can be assured,
wherein in the color conversion mode, the enlargement step enlarges the image at the enlargement magnification limited in the control step.

6. The method according to claim 5, wherein the control step includes a step of setting the enlargement magnification to 1.

7. The method according to claim 5, wherein the control step includes a step of setting the enlargement magnification to the predetermined value in a case that the enlargement magnification instructed in the instruction step exceeds the predetermined value.

8. The method according to claim 5, wherein the processor is further used to perform a returning step of returning the enlargement magnification controlled in the control step to a state before control, after acquisition of the color information using the acquisition step is done.

9. An imaging apparatus having an image display unit which sequentially displays an image captured by an imaging unit in real time as an electronic viewfinder, comprising:
a white balance processing unit configured to perform a white balance process on the image before the image is displayed on the image display unit;
a color conversion unit configured to perform color conversion of color information in the image displayed on the image display unit operating as the electronic viewfinder, wherein the color conversion converts color information of a conversion source color existing in the image displayed on the image display unit operating as the electronic viewfinder into color information of a conversion destination color after the white balance process;
an acquisition unit configured to acquire color information from a predetermined area in the image displayed on the image display unit in a color conversion mode in which the color conversion unit operates;
a determination unit configured to determine the conversion source color and the conversion destination color, at least one of the conversion source color and the conversion destination color being determined based on the color information acquired by the acquisition unit;
an enlargement unit configured to enlarge the image to be displayed on the image display unit using a pixel interpolation processing;
an instruction unit configured to instruct an enlargement magnification to the enlargement unit; and
a control unit configured to limit the enlargement magnification instructed by the instruction unit to a value equal to or less than a predetermined value in the color conversion mode so that the predetermined number of pixels which are not interpolation-processed and used for the color conversion by the color conversion unit in the predetermined area of the enlarged image by pixel interpolation can be assured,
wherein in the color conversion mode, the enlargement unit enlarges the image at the enlargement magnification limited by the control unit, and wherein the white balance processing unit, the color conversion unit, the acquisition unit, the determination unit, the enlargement unit, the instruction unit and the control unit are implemented by one or more processors.

10. A control program for making a computer execute an image processing method of claim 5.

11. A storage medium storing a control program for making a computer execute an image processing method of claim 5.

12. An image processing apparatus comprising:
an image display unit configured to display an image;
a color conversion unit configured to perform color conversion of color information in the image displayed on the image display unit, wherein the color conversion converts color information of a conversion source color existing in the image displayed on the image display unit into color information of a conversion destination color;
an acquisition unit configured to acquire color information from a predetermined area in the image displayed on the image display unit in a color conversion mode in which the color conversion unit operates;
a determination unit configured to determine the conversion source color and the conversion destination color, at least one of the conversion source color and the conversion destination color being determined based on the color information acquired by the acquisition unit;
an enlargement unit configured to enlarge the image to be displayed on the image display unit using a pixel interpolation processing; and
a control unit configured to control the predetermined area so that the larger the enlargement magnification of the enlargement display by the enlargement unit is, the larger the predetermined area is in the color conversion mode so that the predetermined number of pixels which are not interpolation-processed and used for the color converion by the color conversion unit, in the predetermined area of the enlarged image by pixel interpolation can be assured, and wherein the color conversion unit, the acquisition unit, the determination unit, the enlargement unit and the control unit are implemented by one or more processors.

13. The apparatus according to claim 12, further comprising a returning unit configured to return the enlargement magnification controlled by the control unit to a state before control, after acquisition of the color information using the acquisition unit is done.

14. An image processing method comprising:
using a processor to perform the steps of:
an image display step of displaying an image on an image display unit;
a color conversion step of performing color conversion of color information in the image displayed on the image display unit, wherein the color conversion converts color information of a conversion source color existing in the image displayed on the image display unit into color information of a conversion destination color;
an acquisition step of acquiring color information from a predetermined area in the image displayed on the image display unit in a color conversion mode in which the color conversion is performed;
a determination step of determining the conversion source color and the conversion destination color, at least one of the conversion source color and the conversion destination color being determined based on the color information acquired in the acquisition step;
an enlargement step of enlarging the image to be displayed on the image display unit using a pixel interpolation processing; and
a control step of controlling the predetermined area so that the larger the enlargement magnification of the enlargement display by the enlargement step is, the larger the predetermined area is in the color conversion mode so that the predetermined number of pixels which are not interpolation-processed and used for the color conversion in the color conversion step in the predetermined area of the enlarged image by pixel interpolation, can be assured.

15. The method according to claim 14, further comprising:
a returning step of returning the enlargement magnification controlled in the control step to a state before control, after acquisition of the color information using the acquisition step is done.

16. An imaging apparatus having an image display unit which sequentially displays an image captured by an imaging unit in real time as an electronic viewfinder, comprising:
a white balance processing unit configured to perform a white balance process on the image before the image is displayed by the image display unit;
a color conversion unit configured to perform color conversion of color information in the image displayed by the image display unit operating as the electronic view finder, wherein the color conversion converts color information of a conversion source color existing in the image displayed on the image display unit into color information of a conversion destination color after the white balance process;
an acquisition unit configured to acquire color information from a predetermined area in the image displayed on the image display unit in a color mode in which the color conversion unit operates;
a determination unit configured to determine the conversion source color and the conversion destination color, at least one of the conversion source color and the conversion destination color being determined based on the color information acquired by the acquisition unit;
an enlargement unit configured to enlarge the image to be displayed on the image display unit using a pixel interpolation processing; and
a control unit configured to control the predetermined area so that the larger the enlargement magnification of the enlargement display by the enlargement unit is, the larger the predetermined area is in the color conversion mode so that the predetermined number of pixels which are not interpolation-processed and used for the color conversion by the color conversion unit in the predetermined area of the enlarged image by pixel interpolation can be assured, and wherein the white balance processing unit, the color conversion unit, the acquisition unit, the determination unit, the enlargement unit and the control unit are implemented by one or more processors.

17. A control program for making a computer execute an image processing method of claim 14.

18. A storage medium storing a control program for making a computer execute an image processing method claim 14.

19. An image processing apparatus comprising:
an image display unit configured to display an image;
a color conversion unit configured to perform color conversion of color information in the image displayed on the image display unit, wherein the color conversion converts color information of a conversion source color existing in the image displayed on the image display unit into color information of a conversion destination color;
an acquisition unit configured to acquire color information from a predetermined area in the image displayed on the image display unit in a color conversion mode in which the color conversion unit operates;
a determination unit configured to determine the conversion source color and the conversion destination color, at least one of the conversion source color and the conversion destination color being determined based on the color information acquired by the acquisition unit;

an enlargement unit configured to enlarge the image to be displayed on the image display unit using a pixel interpolation processing;

an instruction unit configured to instruct an enlargement magnification to the enlargement unit; and a control unit configured to limit the enlargement magnification instructed by the instruction unit to a value equal to or less than a predetermined value the color conversion mode so that the number of pixels which are not interpolation-processed and used for the color conversion by the color conversion unit in the predetermined area of the enlarged image by pixel interpolation does not fall below a predetermined number, wherein in the color conversion mode, the enlargement unit enlarges the image at the enlargement magnification limited by the control unit, and wherein the color conversion unit, the acquisition unit, the determination unit, the enlargement unit, the instruction unit and the control unit are implemented by one or more processors.

20. An image processing method comprising:

using a processor to perform:

an image display step of displaying an image on an image display unit;

a color conversion step of performing color conversion of color information in the image displayed on the image display unit, wherein the color conversion converts color information of a conversion source color existing in the image displayed on the image display unit into color information of a conversion destination color;

an acquisition step of acquiring color information from a predetermined area in the image displayed on the image display unit in a color conversion mode in which the color conversion is performed;

a determination step of determining the conversion source color and the conversion destination color, at least one of the conversion source color and the conversion destination color being determined based on the color information acquired in the acquisition step;

an enlargement step of enlarging the image to be displayed on the image display unit using a pixel interpolation processing; and an instruction step of instructing an enlargement magnification used in the enlargement step;

a control step of limiting the enlargement magnification instructed in the instruction step to a value equal to or less than a predetermined value in the color conversion mode so that the number of pixels which are not interpolation-processed and used for the color conversion in the color conversion step in the predetermined area of the enlarged image by pixel interpolation does not fall below a predetermined number, wherein in the color conversion mode, the enlargement step enlarges the image at the enlargement magnification limited in the control step.

21. An imaging apparatus having an image display unit which sequentially displays an image captured by an imaging unit in real time as an electronic viewfinder, comprising:

a white balance processing unit configured to perform a white balance process on the image before the image is displayed on the image display unit;

a color conversion unit configured to perform color conversion of color information in the image displayed on the image display unit operating as the electronic viewfinder, wherein the color conversion converts color information of a conversion source color existing in the image displayed on the image display unit operating as the electronic viewfinder into color information of a conversion destination color after the white balance process;

an acquisition unit configured to acquire color information from a predetermined area in the image displayed on the image display unit in a color conversion mode in which the color conversion unit operates;

a determination unit configured to determine the conversion source color and the conversion destination color, at least one of the conversion source color and the conversion destination color being determined based on the color information acquired by the acquisition unit;

an enlargement unit configured to enlarge the image to be displayed on the image display unit using a pixel interpolation processing;

an instruction unit configured to instruct an enlargement magnification to the enlargement unit; and a control unit configured to limit the enlargement magnification instructed by the instruction unit to a value equal to or less than a predetermined value in the color conversion mode so that the number of pixels which are not interpolation-processed and used for the color conversion by the color conversion unit in the predetermined area of the enlarged image by pixel interpolation does not fall below a predetermined number, wherein in the color conversion mode, the enlargement unit enlarges the image at the enlargement magnification limited by the control unit, and wherein the white balance processing unit, the color conversion unit, the acquisition unit, the determination unit, the enlargement unit, the instruction unit and the control unit are implemented by one or more processors.

* * * * *